United States Patent Office 2,707,374
Patented May 3, 1955

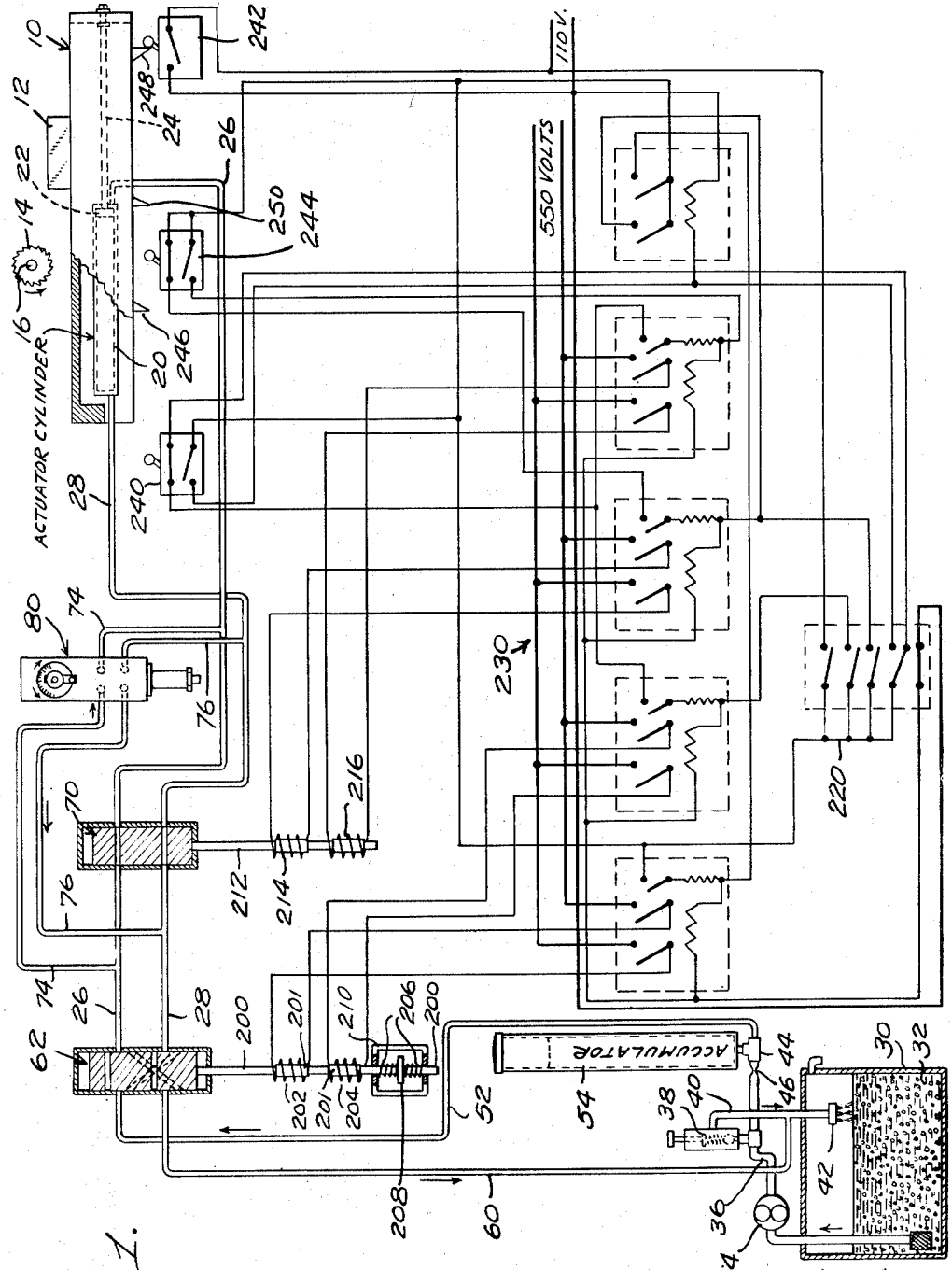

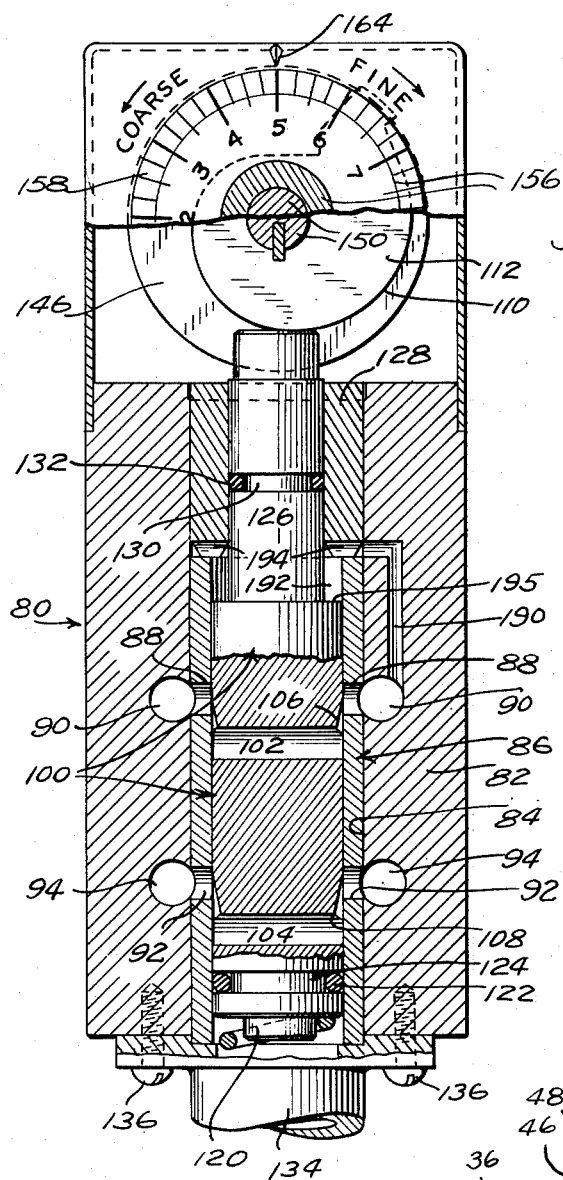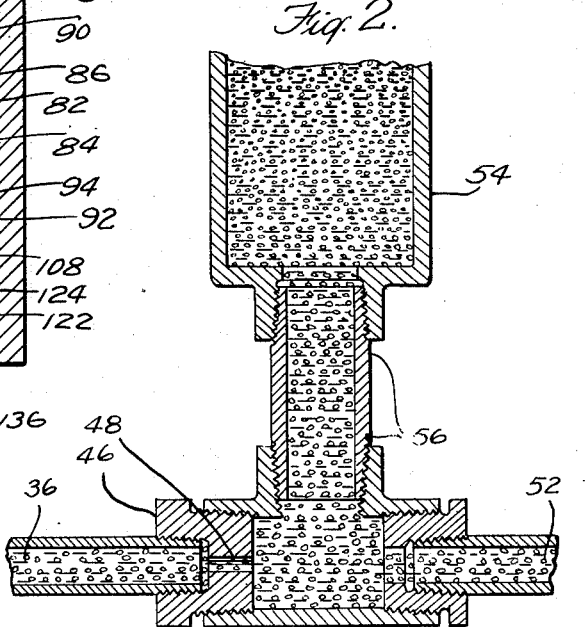

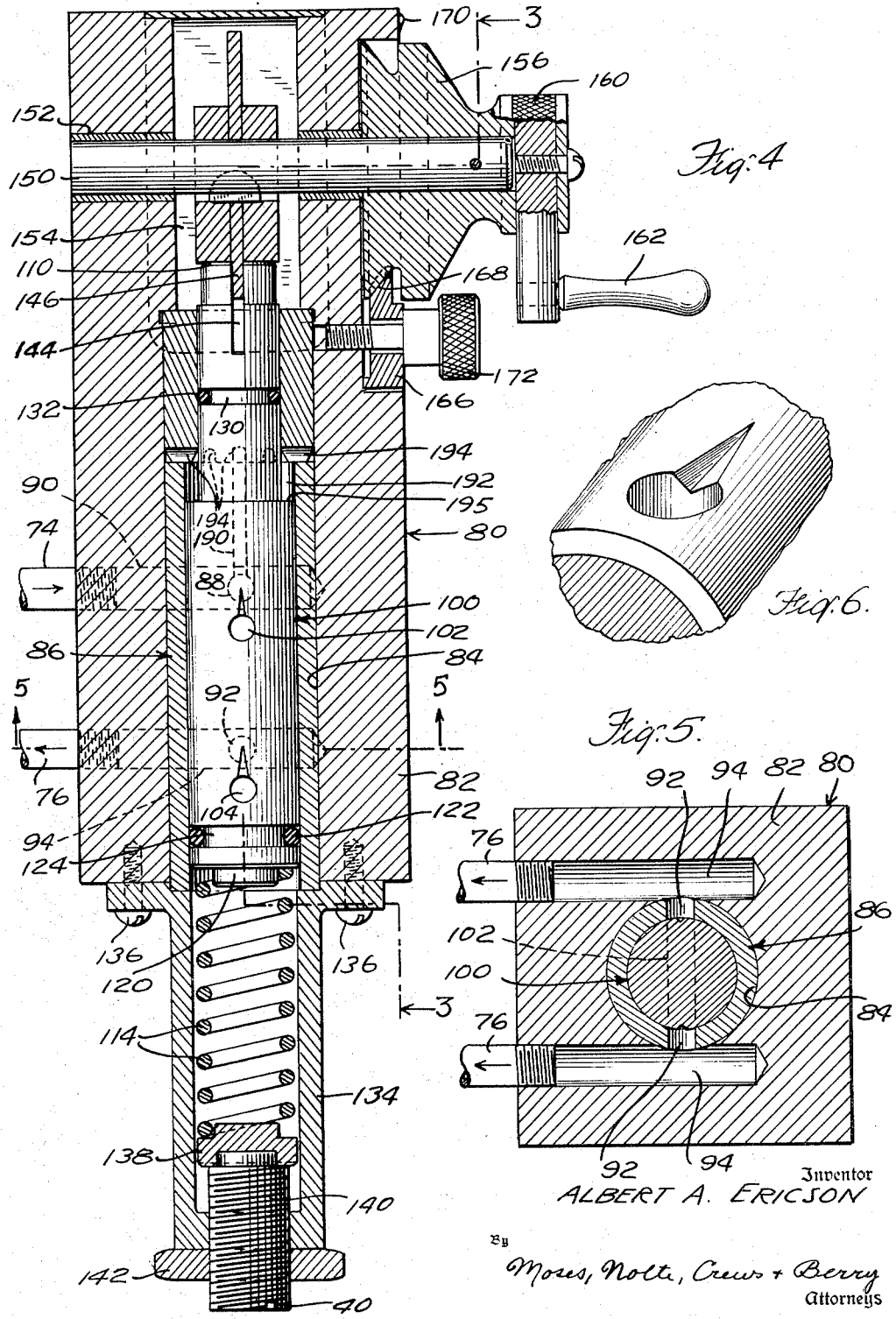

2,707,374

HYDRAULIC DRIVE FOR MACHINE TOOLS HAVING AUTOMATIC CONTROL OF CUTTING PRESSURE

Albert A. Ericson, Glenwood Landing, N. Y., assignor to The Farmingdale Corporation, a corporation of New York Application March 18, 1948, Serial No. 15,523

9 Claims. (Cl. 60—51)

This invention relates to hydraulic drive for machine tools having automatic control of cutting pressure. Hydraulic drives present many advantages over the mechanical drives more commonly used, in that they present greater mechanical simplicity, require less parts, result in saving power due to elimination of friction of gears, feed screws, etc., provide for simplicity of control thereby reducing operator fatigue, and also permit of an infinite number of rates of feed depending upon the adjustment of the control valve as distinguished from the limited number of feeds obtainable by mechanical means such as change gears, or other rate of feed adjusting devices. The potential advantages inherent in hydraulic feeds have not, however, been fully secured in existing hydraulic feed devices, because satisfactory feed control has not been achieved by such devices. This has been due in part to the fact that the liquid medium used for transmitting the hydraulic power is substantially incompressible resulting in over rigidity of drive, and to the fact that if excess pressure were provided, as is necessary to permit of efficient operation, such pressure could not be satisfactorily controlled or prevented from building up to a point resulting in breakage and injury to tools, machines or parts whenever any abnormality in operating conditions occurred.

The objects of the present invention are to overcome the defects heretofore encountered in utilizing hydraulic feeds for machine tools to enable the full advantage to be taken of the greater flexibility and simplicity of hydraulic feeding means and to greatly increase rates of machining over what has been possible heretofore by the use of either mechanical or hydraulic feeds.

It is a more specific object of the invention to provide improved control means for controlling the action of the machine tool.

It is a further object of the invention to provide an improved restrictor valve mechanism for controlling the inlet and discharge orifices to and from the actuator during the actual working part of the cycle.

It is known that in the operation of most machine tools a skillful hand operator can control the feed so as to remove material more rapidly and with better results than can be accomplished by machine feeding, either mechanical or hydraulic. This is because mechanical feeds are so set as to operate at a uniform speed for a particular operation and heretofore hydraulic feeds have been devised to produce uniform rates of feeds so far as is possible so as to secure the same results as secured by mechanical feeds. Such mechanical and hydraulic feeds, therefore, lack the sensitivity of the hand of the skilled operator. In accordance with the present invention, a sensitive hydraulic feed is provided which simulates in its action the sensitiveness of the operator's hand, but acts more rapidly and more regularly than the hand so as to instantly respond to any change in the work resistance, increasing the rate of feed to take advantage of any reduction in such resistance and instantly slowing down the feed if the resistance is increased so as to prevent breakage or injury to the tool or work.

The above and other objects of the invention are accomplished by the instrumentalities and in the manner described in detail in connection with a preferred embodiment of the invention shown to illustrate the principles thereof.

The improvements in hydraulic drives for machine tools disclosed herein utilize features of the inventions described and claimed in applications for patent filed by me, Serial No. 567,438 filed December 9, 1944, now Patent No. 2,647,371 issued August 4, 1953, and Serial No. 650,073 filed February 25, 1946, now abandoned.

As described and claimed in application Serial No. 650,073 above referred to, it is preferred to use a hydraulic liquid which is rendered elastic to the extent desired by the introduction thereinto of a gas such as air, the liquid and gas mixture being maintained during use under a high pressure. This liquid gas mixture is utilized in a system including an actuator which may be used to drive either the tool or the workpiece, or both. The form of actuator usually employed is a standard piston and cylinder actuator used in many hydraulic machine tool drives. The hydraulic system also includes an accumulator properly proportioned in size in accordance with the size of actuator used and located sufficiently close to the actuator to be responsive to changes in pressure conditions caused in the latter by resistances encountered during the relative feed between the tool and work. The system also includes a suitable control valve means for regulating the flow of the hydraulic fluid to and from the actuator.

The invention is particularly applicable to machine tools for the working of metals, although it may also be applied to tools for working upon plastics or other materials. The invention may be practiced in connection with power-driven machine tools of various types, such as milling machines, broaching machines, lathes, drills, planers, shapers, and other types of tools. In some of these tools, the cutter is rotated and the work fed into contact therewith, while in others the work and the tool may be moved relatively to one another as in the broaching machine, planer and shaper; while in some instances, the work may be rotated and the tool moved relatively thereto as in a lathe. The invention finds particular utility in connection with machines of the milling machine type in which the hydraulic feed is used to bring the work into contact with a rotary multi-toothed cutter.

A characteristic advantage of the hydraulic drive of the present invention is that by its use it is possible to employ tools with more acute edges, that is, with greater rake, clearance angles, etc., than it is possible to use for similar work under present practice. This enables the tools to operate more effectively and to do the same work with less expenditure of power.

In the accompanying drawings in which one preferred embodiment of the invention is illustrated in connection with milling machines:

Fig. 1 is a diagrammatic view of a hydraulic system applied to a milling machine, also showing the wiring diagram of electrical controls which may be employed;

Fig. 2 is a vertical section showing an accumulator and connections thereto on a larger scale than Fig. 1, parts being broken away;

Fig. 3 is a sectional view of a restrictor valve taken on line 3—3 of Fig. 4 and showing portions broken away;

Fig. 4 is a vertical central section of the restrictor valve on a plane at right angles to the section of Fig. 3;

Fig. 5 is a horizontal section of the restrictor valve on line 5—5 of Fig. 4; and Fig. 6 is a perspective view on an enlarged scale of a portion of the valve plunger.

Referring to the drawings in detail:

Fig. 1 shows for purposes of illustration a conventional milling machine table 10 upon which is mounted a workpiece 12 which is adapted to be brought by movement of the table 10 into contact with a rotary toothed cutter 14 mounted on the arbor 16 of the milling machine. A reciprocating actuator 20 is provided which is shown in the form of a cylinder mounted on the base of the milling machine (not shown) under the table 10, in which works a piston 22 carried by a piston rod 24 which is attached to the table. Connected to the ends of the cylinder are pipes 26 and 28 through which fluid is alternately admitted so as to move the table back and forth and feed the workpiece into contact with the cutter.

Any suitable source of fluid under pressure is provided. As shown, a sump 30 is partly filled with a body of hydraulic liquid 32 which is pumped out of the sump by the pump 34 and forced at high pressure through the pipe 36. A spring loaded relief valve 38 which may be of any conventional type is connected to the pipe 36. The overflow from the relief valve discharges into a pipe 40 which has a spray head 42 at its lower end through which any excess oil is forcibly sprayed into the oil in the sump. The discharge of the oil into the sump in this manner results in the entrainment of air which is carried into the oil in the sump in the form of very small bubbles so that the oil in the sump is maintained in an aerated condition and constantly filled with the small air bubbles which are picked up by the pump along with the oil and pumped throughout the system.

The pipe 36 discharges into a T-connection 44 shown on an enlarged scale in Fig. 2. The T-connection 44 is preferably of substantially larger diameter than the pipe 36 so as to form an enlarged storage or turbulence chamber within it. Between the pump and the T-connection there is a restriction in the pipe 36 constituting a hydraulic resistance. In the construction shown in Fig. 2, this resistance is provided by a reducing nipple 46 which has a hole 48 therethrough substantially smaller in diameter than pipe 36. As an example of dimensions which may be used for these parts but without restricting the invention in any way to such dimensions, the pipe 36 may be a ¾" pipe. The T-connection 44 may have a bore of 2" and the restricted orifice in the nipple may have a length of about 1" and an inside diameter of about ¼". Connected to the other side of the T-connection is a power line 52 which may comprise a pipe of ½" or ¾" size having an inside diameter of, say 7/16". Mounted on the side of the T-connection is an accumulator 54 which in the instance shown is a chamber closed at its upper end having an inside diameter of about 4" and a length of about 28", being connected to a T-connection by a nipple 56 having in the particular example illustrated an inside diameter of about 1½". The dimensions of the accumulator both as to length and diameter will be varied in accordance with the size of the actuator cylinder 20. In the particular example illustrated, the actuator comprises a cylinder of 2" inside diameter and about 22" long. This is a conventional size and the dimensions given for the accumulator are suitable for an accumulator to be used with this size actuator. If the cylinder of the actuator is larger or smaller, an accumulator of corresponding size should preferably be employed to obtain the best results. A pipe 60 is provided for the return flow of liquid from the actuator to the sump. This pipe preferably discharges into the side of the pipe 40 so that the returning liquid passes into the sump through the spray head 42 and assists in entraining air in the liquid.

A suitable reversing valve indicated at 62 is provided for establishing connections alternately between the pressure supply pipe 52 and the return pipe 60 and the pipes 26 and 28 leading to the ends of the cylinder. If the pipe 52 is connected through the reversing valve to the pipe 26, then the actuator piston is moved to the left in Fig. 1 and the work is brought into contact with the cutter. This will be referred to as the power stroke. At this time the discharge from the cylinder takes place through the pipe 28 and the pipe 60. When the power line 52 is connected to the pipe 28, then the milling machine table is moved to the right. This will be referred to as the return stroke. The valve 62 is a three-position valve. When in neutral position, as shown in Fig. 1, both lines 26 and 28 are cut off from communication with lines 52 and 60 so that operation is stopped. When the valve is moved to the down position, then line 52 is connected to line 26 and the table is moved towards the left on the power stroke. When the valve is in uppermost position, line 52 is connected to line 28 and the return stroke is taking place. The passages in valve 62 are preferably of such size as to permit a rapid traverse of the milling machine table. The speed of traverse is made as rapid as is consistent with good practice and is determined by the size of the ports in the valve 62 and by the size of the restriction 48. The full speed thus permitted may be used on the entire return stroke of the table and is preferably employed on those parts of the power stroke except the part of the stroke in which the workpiece is actually being operated upon by the cutter. During this part of the stroke, the speed of movement of the table must be reduced to the speed at which the material can be safely removed by the cutter.

In order to regulate the speed of traverse during the cutting part of the stroke, a restrictor valve mechanism is utilized as follows: a two-position cutoff valve 70 is provided which may be of any suitable construction and is preferably designed to stop flow through both of the pipes 26 and 28. As shown, the valve 70 is of a reciprocating type having two passages therethrough. If the valve is in position shown in Fig. 1 an uninterrupted flow is permitted through the valve passages so that pipes 26 and 28 are open from end to end. In the other position, both pipes 26 and 28 are cut off. When the valve 70 is in this latter position, restricted flow takes place through the bypass pipes 74 and 76, 74 passing from pipe 26 at one side of the valve 70 to the same pipe at the opposite side of the valve, while pipe 76 bypasses the return pipe 28 around the valve 70. The valve 70 is so manipulated that it is closed during traverse of the workpiece past the cutter so that during this time the hydraulic fluid for operating the feed passes through the pipes 74 and 76.

For controlling the flow through the pipes 74 and 76, and, therefore, the actual rate of feed during the cutting part of the stroke, a restrictor valve 80 is provided. A preferred form of restrictor valve is shown in Figs. 3, 4 and 5 and it comprises a casing 82 having a longitudinal bore 84 therethrough in which is permanently fitted a sleeve 86. The sleeve 86 has a pair of ports 88 therein which communicate with horizontal bores 90 in the casing wall, these bores being connected to the two sections of the pipe 74 at the opposite sides of the restrictor valve. The sleeve 86 also has two ports 92 therein which communicate with horizontal bores 94 in the valve casing, such bores being connected with portions of the pipe 76 at each side of the restrictor valve. By providing the ported sleeve 86 fitting in the casing with the horizontal bores therein communicating with the ports in the sleeve, a port construction is provided in the casing in which the actual ports are formed in the sleeve and it is only necessary to bore the four holes 90 and 94, respectively, transversely of the casing, so as to introduce fluid to the ports 88 and 92.

As in the construction shown, the actual cutting is done only on the stroke of the milling machine table from right to left, it will be seen that the high pressure from the pump is conducted to the actuator through the pipes 26, 52 and 74 so that the ports 88 constitute the high pressure ports while ports 92 constitute return ports.

For controlling the flow of fluid through the restrictor valve, a valve plunger 100 is provided which is capable of limited endwise movement in the sleeve 86. The plunger 100 has a transverse bore 102 adapted to connect the high pressure ports 88 and a transverse bore 104 adapted to connect the low pressure ports 92. Preferably, the bores 102 and 104 are of the same diameter as the ports so that if the plunger were moved to bring the bores into alignment with the ports there would be unrestricted flow. Under normal conditions however it is necessary to restrict the flow very substantially so as to bring about a proper rate of feed for the table. Normally, therefore, the plunger is displaced downwardly in the valve casing so that the flow through both the high pressure and low pressure ports is greatly reduced.

In order to make possible an accurate metering of the flow, means are provided whereby the plunger may be moved longitudinally for considerable distances for very small changes in the rate of flow. In the construction shown, this is accomplished by providing notches 106 in the plunger at each end of the bore 102 and similar notches 108 at the opposite ends of the bore 104. These notches are preferably of right angle section at the bottom as shown in Fig. 6 and are inclined from maximum depth at their ends where they open into the bores to zero where they merge into the cylindrical wall of the plunger. With this construction it will be seen that when the flow of fluid through the restrictor valve is to be sharply controlled, the bores 102 and 104 are out of alignment with the ports 88 and 92, respectively, and actual flow is taking place only through the notches 106 and 108. This is the condition shown in Figs. 3 and 4 and may be regarded as a normal condition of use. With this construction a substantial endwise movement of the plunger results in a comparatively small change in the effective size of the orifices. Actually, the variation of size of the orifices will vary approximately as the square root of the distance moved by the plunger. This permits a very accurate adjustment of the flow and corresponding regulation of speed of the feed of the work.

For adjusting the position of the plunger longitudinally in the valve casing so as to determine the normal maximum speed of cutting feed, the plunger is held between the cam surface 110 of a cam 112 which engages one end of the plunger and a heavy spring 114 which engages the other end of the plunger and at all times urges the plunger towards the cam. The plunger has a reduced end 120 adapted to fit in the end of the spring 114, the plunger near its lower end being provided with a suitable packing to prevent leakage. As shown, this packing comprises an O-ring 122 mounted in a groove 124 in the plunger. The other end of the plunger has a stem 126 of reduced diameter which fits with a close sliding fit in a sleeve 128 having a press fit in the bore of the casing. The stem 126 of the plunger is provided with a groove 130 in which is a packing such as a rubber O-ring 132. The spring 114 is contained within a housing or cap 134 which is secured to the lower end of the valve casing in any suitable manner as by screws 136. The lower end of the spring engages an adjustable abutment 138 which is mounted on an adjusting screw 140 screwed through the lower end of the housing and locked in adjusted position by a lock nut 142.

The upper end of the stem 126 of the valve plunger normally bears against the cam surface 110. In the particular construction shown, the upper end of this stem is shown as bifurcated by a slot 144 and the cam surface is divided into two parts by a disc 146 which is circular in outline and which fits in the slot 144. This engagement of the disc with the slot serves to hold the plunger against turning. Obviously, any other means for preventing the plunger from turning may be employed. The cam 112 is keyed to a shaft 150 which is rotatively mounted in bushings 152 in the valve casing. The upper end of the valve casing is provided with a transverse recess 154 to receive the cam and the projecting end of the plunger. Mounted on the end of shaft 150 at the front of the valve casing is a knob 156, preferably having graduations 158 marked on its surface. The knob is shown as provided with a knurled head 160 and a crank handle 162. A suitable zero mark 164 is provided on the face of the valve casing. In case it is desired to lock the setting of the knob 156 and cam 112, a locking shoe 166 is provided which has a curved inclined surface 168 for engagement with a beveled flange 170 on the knob 156. A knurled headed clamp screw 172 is provided for clamping the shoe against the knob.

From the construction described it will be seen that manually adjustable means are provided for the initial accurate adjustment of the orifices in the restrictor valve. When the knob is turned to the right as seen in Fig. 3, the cam will force the plunger down against the pressure of spring 114 thereby reducing the flow through the notches 106 and 108. This slows down the feed of the carriage and produces a finer cutting action. When the knob is rotated in the opposite direction, the cam will permit the plunger to be moved upwardly by the spring 114, thereby increasing the effective size of the orifices and the rate of feed, resulting in a coarser cut.

The restrictor valve in the construction shown performs a very important function besides mere manual regulation of the rate of feed. It is so constructed as to act as an automatic regulating valve simultaneously controlling both the power flow to the actuator and the return flow therefrom, the regulation being automatically brought about by variation of pressure in the system, preferably in the power or high pressure line. The construction shown for this purpose comprises a passageway 190 formed in the valve casing and connecting one of the high pressure bores 90 with the space 192 above the shoulder 195 formed on the valve plunger between the main body thereof and the stem 126. As shown, the passageway 190 communicates with the space 192 through the notches 194 formed in the end of the sleeve 128. It will be seen that if the pressure in the high pressure line rises to a point where the pressure on the shoulder 195 is sufficient to overcome the resistance of the spring 114, then the plunger will be moved down slightly away from its position as determined by the setting of the cam 112. This downward movement of the plunger will at once reduce the flow through the metering notches 106 and 108 and will restrict the flow to and from the actuator which will reduce the rate of feed of the table.

The described automatic regulative action of the restrictor valve is very important. Assuming that the normal setting of the valve is such as to give a feed during the cutting stroke as high as is safe under optimum conditions of tool and workpiece, if an increased resistance is encountered the resulting slowing up of the table movement will permit the pressure to build up which will cause the plunger to be moved down sufficiently to check the flow so that the work will not be driven against the tool in such manner as to cause damage. Any forward surge immediately after the hard spot is passed will also be prevented, by reason of the fact that actuating force has not been built up to an excessive value. An increased force under control of the valve system must precede any increase in speed. When, however, the resistance to the feed of the work against the tool is decreased, the pressure will fall and the plunger will move upward so as to increase the flow and increase the rate of feed.

Suitable means are provided for controlling the operation of the system. Preferably, these include manual devices for starting and stopping and which may also be used for reversing and for changing the rate of feed from rapid traverse to controlled traverse. The valve 80 functions as a flow regulator, the flow orifices being varied by not closing, the functions of closing off the conduits, when necessary, being performed by the valves 62 and 70. In addition to such manual controls, mechanism is preferably provided for reversing the traverse of the carriage and for changing from rapid traverse to controlled traverse during the part of the power stroke when the actual cutting is to be performed, such that these actions are automatic once the machine has been started. Any suitable arrangement for accomplishing these results may be employed but in the drawings a simplified electrical system of controls is provided.

Referring particularly to Fig. 1, the stem 200 of the valve 62 carries cores 201 located in the solenoid coils 202 and 204. When the coil 202 is energized, the valve is moved into position for return traverse, while when the coil 204 is energized, the traverse will be forward. An arrangement for biasing the valve to a neutral position is provided so that when neither coil is energized the valve is in the position shown in Fig. 1 with all flow of fluid cut off and the machine stopped. A typical arrangement of biasing springs is illustrated comprising two springs 206 mounted on the stem 200 and engaging opposite sides of a cross plate 208 fixed on the stem. The springs are contained in a stationary box 210 so that whenever the valve is moved to one or the other of its limit positions by one of the solenoids one or the other of these springs 206 is stressed.

The valve stem 212 of the shutoff valve 70 is controlled by two solenoids 214 and 216. The valve 70 is not spring biased but will stand in either one of its limit positions to which it may be moved by one of the solenoids until it is thrown into its other position by the action of the other solenoid. The solenoid 214 will move the valve to the position it will occupy throughout the rapid traverse part of the cycle which includes all of the return stroke and part of the forward stroke. When the solenoid 216 is energized, the valve is then thrown to the position in which it cuts the direct flow through the pipes 26 and 28, thereby causing the flow to take place through the bypass pipes 74 and 76 and resistor valve 80. This causes the traverse during the period of actual cutting to be controlled by the setting of the restrictor valve as already described.

For starting and stopping the machine and for any other manual control desired, the series of manual control switches indicated generally at 220 is shown. These operate through a series of holding relay circuits indicated generally at 230 to control the action of the valves. For automatic reversal and shifting from rapid traverse to controlled traverse, three switches 240, 242 and 244 are provided. These are actuated by trippers 246, 248 and 250 which are adjustably mounted on the carriage or table of the milling machine. These switches are arranged to control the action of the valve operating solenoids through the holding relay means indicated at 230. The circuits and holding relay means are of conventional construction and are not, therefore, described in detail.

Briefly, the operation of the control mechanism is as follows: Assuming that just after the machine is started by operation of the proper manual control switches, the table 10 reaches the end of the return traverse, that is, the position furthest to the right in Fig. 1. At this time it trips the switch 242. This will result in closing the circuit through the solenoid 204 which will place and hold the valve 62 in position for forward traverse. During the return stroke, the valve 70 has remained in the rapid traverse position already described and it stays in this position during the rapid traverse part of the forward stroke. Prior to the actual engagement of the work 12 with the cutter 14, however, the tripper 250, having been properly adjusted in position for that purpose, comes into action and trips the switch 244. The tripping of this switch results in temporary energization of the solenoid 216 which will move the valve 70 so as to cut off the direct flow through the pipes 26 and 28, thereby causing the flow to take place through the bypass in which the restrictor valve is located. The remainder of the forward stroke of the table is, therefore, controlled by the restrictor valve. When the end of the forward stroke is reached, the tripper 246 trips the switch 240 which energizes the solenoid 202, thereby shifting the valve 62 to the position for the return stroke of the table. At the same time, through the proper holding relay circuits, the solenoid 214 is energized long enough to shift the valve 70 to rapid traverse position.

It will be noted that as the valve 62 is spring biased to neutral position, one or the other of the solenoids 202 and 204 which operate it must be kept energized throughout the operation. This is accomplished by a suitable arrangement of the holding relay circuits. The valve 70, however, not being spring biased will stand in whatever position it is set. Therefore, the solenoids 214 and 216 are energized momentarily at proper points in the cycle to shift the valve 70 from one of its positions to the other. This momentary energizing of one or the other solenoids 214, 216 is also accomplished by the arrangement of the holding relay circuits.

I claim:

1. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line and a valve element movably mounted in said casing having fluid passages regulating the rate of flow of the fluid through said pressure and return lines and means for adjusting the position of said valve element so as to simultaneously regulate flow through said pressure and return lines.

2. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve comprising a casing having ports connected with the pressure line and ports connected with the return line, a valve element movably mounted in said casing having fluid passages regulating the rate of flow of the fluid through said pressure and return lines, means for manually and means for automatically adjusting the position of said valve element so as to simultaneously regulate the flow through said pressure and return lines.

3. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, a plunger mounted to move longitudinally in said casing and having metering ports therein communicating with the ports connected to the pressure line and return line respectively and means responsive to the pressure in at least one of said lines for automatically adjusting the position of said plunger in accordance with the line pressure.

4. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, a plunger mounted to move longitudinally in said casing and having metering ports therein communicating with the ports connected to the pressure line and return line respectively, means responsive to the pressure in the pressure line for automatically adjusting the position of said plunger in accordance with the pressure in the pressure line, said means comprising a spring bearing against one end of said plunger, said plunger having a neck of reduced diameter and a shoulder thereon, a chamber in the casing surrounding said neck of reduced diameter, and means for introducing fluid under pressure from the pressure line into said chamber so as to move said plunger against the resistance of said spring upon increases of pressure in the pressure line and vice versa.

5. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, a plunger mounted to move longitudinally in said casing and having metering ports therein communicating with the ports connected to the pressure line and return line respectively, spring means for moving said plunger in one direction and manually adjustable means for moving said plunger in the other direction against the resistance of the spring means.

6. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, a plunger mounted to move longitudinally in said casing and having metering ports therein communicating with the ports connected to the pressure line and return line respectively, spring means for moving said plunger in one direction and manually adjustable means for moving said plunger in the other direction against the resistance of the spring means, said manually adjustable means comprising a shaft mounted in said casing to rotate about an axis at right angles to the axis of the plunger, a cam mounted on said shaft engaging the end of the plunger, and means for rotating said shaft through determinable angles.

7. A hydraulic feed for machine tools comprising an actuator for bringing about relative feed betwen the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, a plunger mounted to move longitudinally in said casing and having metering ports therein communicating with the ports connected to the pressure line and return line respectively, spring means for moving said plunger in one direction and manually adjustable means for moving said plunger in the other direction against the resistance of the spring means, said manually adjustable means comprising a shaft mounted in said casing to rotate about an axis at right angles to the axis of the plunger, a cam mounted on said shaft engaging the end of the plunger, a rotatable head mounted on said shaft, cooperating indicia on the head and casing by which the angular adjustment of the head may be determined, and means for holding the cam in adjusted position.

8. A hydraulic feed for machine tools, comprising an actuator for bringing about relative feed between the tool and the work, a source of liquid under pressure, means for introducing air into the liquid under pressure in sufficient quantity to render the liquid somewhat elastic, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, said restrictor valve means comprising a casing having ports connected with the pressure line and ports connected with the return line, and a valve element movably mounted in said casing having fluid passages regulating the rate of flow of the liquid through said pressure and return lines, means for adjusting the position of said valve element so as to regulate flow through said pressure and return lines, and an accumulator in the pressure line between the pressure source and actuator, said accumulator comprising a chamber having an elastic body of air trapped therein by liquid in communication with the liquid in the actuator, said pressure line having an enlargement therein forming a turbulence chamber at the point of connection of the accumulator to the pressure line.

9. A hydraulic feed for machine tools comprising an actuator for bringing about relative feed between the tool and the work, a source of liquid under pressure, a pressure line leading from the pressure source to the actuator, a return line from the actuator, cut-off valve means for opening and closing said lines, bypasses in said pressure and return lines around said cut-off valve means, restrictor valve means in said bypasses for controlling the flow to and from the actuator when the cut-off valve means are closed, all the said valve means comprising mechanism operable independently of the actuator for controlling supply and discharge of liquid to and from the actuator, means including solenoids and electrical connections thereto for automatically actuating said cut-off valve means at predetermined points in the operating cycle of the actuating means, a reversing valve, means for biasing said reversing valve to a neutral shut-off position, a pair of solenoids connected to said valve one of which, when energized, moves the valve to forward position and the other to rearward position, and electrical connections for said solenoids including switch means for automatically alternately energizing said solenoids at the respective ends of the actuator stroke.

References Cited in the file of this patent

UNITED STATES PATENTS

| | | |
|---|---|---|
| 732,908 | Thomson | July 7, 1903 |
| 1,093,918 | Cubelic | Apr. 21, 1914 |

(Other references on following page)

UNITED STATES PATENTS

| | | |
|---|---|---|
| 1,147,820 | Scott | July 27, 1915 |
| 1,806,305 | Mueller | May 19, 1931 |
| 1,877,102 | Whitesell | Sept. 13, 1932 |
| 2,051,052 | Morgan | Aug. 18, 1936 |
| 2,245,080 | Pendleton | June 10, 1941 |
| 2,300,338 | Camerota | Oct. 27, 1942 |
| 2,408,303 | Ernst | Sept. 24, 1946 |
| 2,432,305 | Geiger | Dec. 9, 1947 |

OTHER REFERENCES

Ser. No. 261,139, Waltenbauer (A. P. C.), published Apr. 27, 1943.